United States Patent [19]

Sigworth, Jr.

[11] 4,346,731

[45] Aug. 31, 1982

[54] BUOYANT ELEMENT CHECK VALVE FOR A THERMOSIPHON ENERGY SYSTEM

[75] Inventor: Harry W. Sigworth, Jr., Orinda, Calif.

[73] Assignee: Chevron Research Company, San Francisco, Calif.

[21] Appl. No.: 267,130

[22] Filed: May 26, 1981

[51] Int. Cl.³ .................. F16K 31/22; G05D 23/00
[52] U.S. Cl. ................... 137/433; 126/418; 126/434; 137/468; 137/533.11; 137/564; 165/32; 165/96; 236/93 R
[58] Field of Search ............ 126/418, 434; 137/429, 137/430, 433, 533.11, 533.13, 533.15, 468, 564, 337, 340; 165/1, 32, 96; 236/93 R, 99 J; 251/11

[56] References Cited

U.S. PATENT DOCUMENTS

| 2,842,155 | 7/1958 | Peters | 137/468 |
| 3,929,123 | 12/1975 | Hasty | 137/564 |
| 3,969,605 | 7/1976 | Danell | 137/533.11 |
| 4,050,508 | 9/1977 | Buckley | 165/32 |
| 4,137,964 | 2/1979 | Buckley | 165/1 |
| 4,245,617 | 1/1981 | Buckley | 137/564 |
| 4,286,573 | 9/1981 | Nickel | 137/433 |

FOREIGN PATENT DOCUMENTS

| 121150 | 3/1946 | Australia | 137/564 |
| 1242310 | 8/1960 | France . | |

Primary Examiner—George L. Walton
Attorney, Agent, or Firm—D. A. Newell; E. J. Keeling

[57] ABSTRACT

A check valve for a thermosiphoning solar energy system having a buoyant movably disposed element situated between primary and auxiliary valve seats. Under normal operating conditions flow enters the top of the valve and passes downwardly through the primary seat thereby dislodging the movable element from its seated position. The element, however, is designed to have a density greater than the fluid at high temperatures, which causes the element to lodge in the auxiliary seat to prevent the further flow of the thermosiphoning fluid.

7 Claims, 3 Drawing Figures

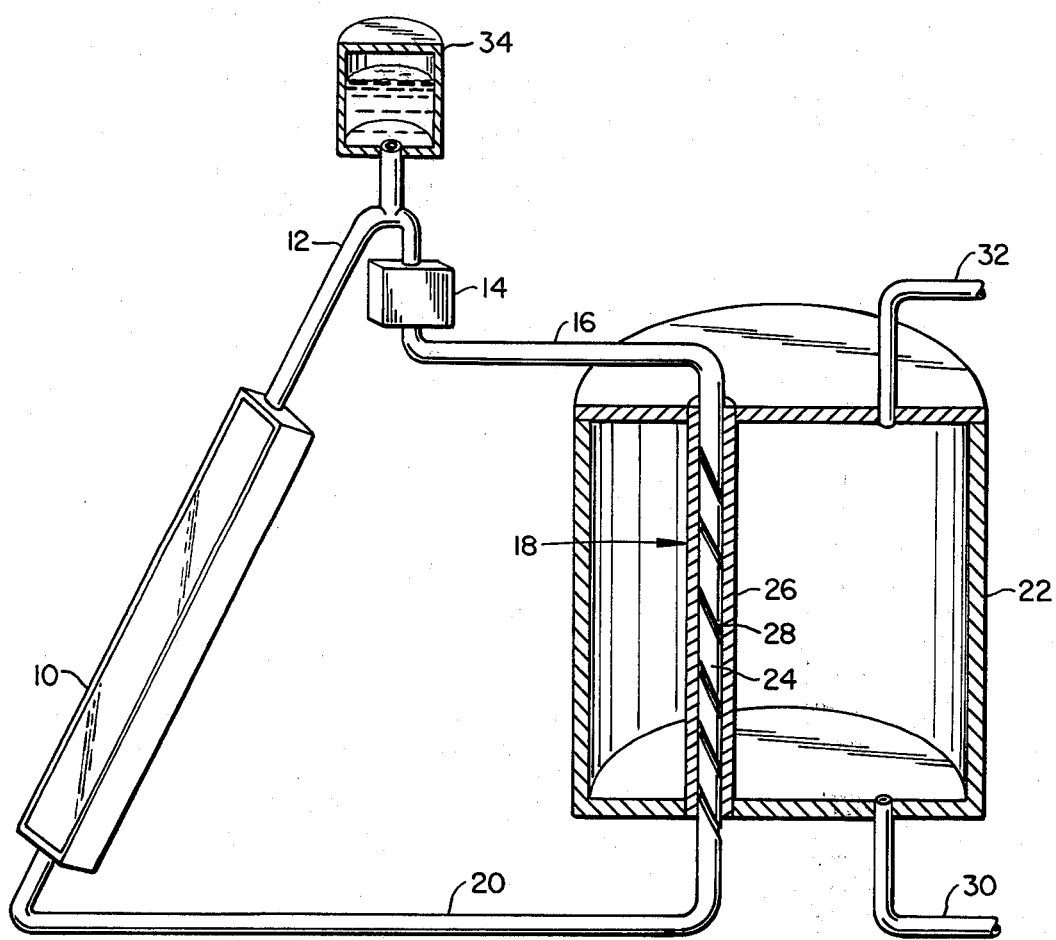
FIG._1.

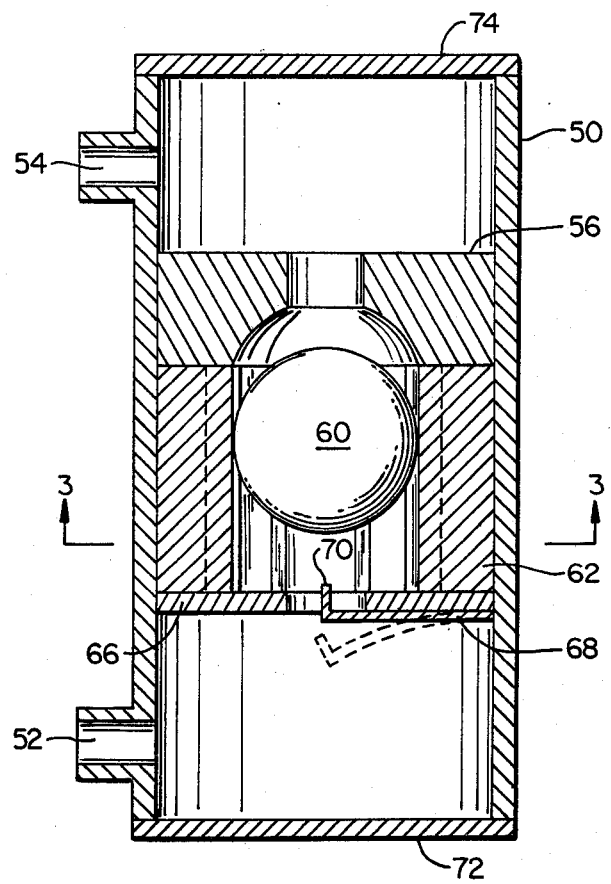
FIG._2.
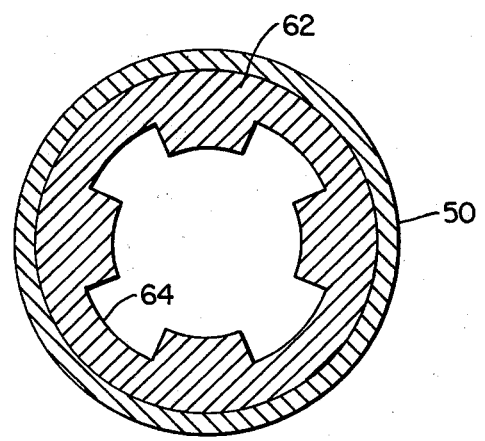
FIG._3.

BUOYANT ELEMENT CHECK VALVE FOR A THERMOSIPHON ENERGY SYSTEM

BACKGROUND OF THE INVENTION

1. Field of the Invention

The present invention finds principal application in the field of passive solar energy systems. More particularly, the invention relates to a sensitive buoyant element check valve for use in solar energy systems which employ a thermosiphoning loop of liquid to convectively transfer heat.

2. Prior Art

With the dwindling supplies of fossil fuel and the accompanying increasing energy costs, extensive research efforts are being focused to harness solar radiation on a practical and economical scale. One type of device which shows promise in the field is a thermosiphon system, described in U.S. Pat. No. 4,137,964, issued to Bruce Shawn Buckley and in U.S. application Ser. No. 6,767, filed Jan. 26, 1979, by the same inventor, is now U.S. Pat. No. 4,245,617.

As disclosed in the above references, a "thermic diode" panel collects and stores the sun's radiant energy. The panel typically comprises a shallow rectangular box that is effectively divided into two chambers which are insulated from each other. The chambers are filled with a heat transport liquid, such as water, and are in open communication with each other at the bottom and at the top of the panel.

Solar radiation incident on the outer panel face will heat the water in the collector chamber. As the water expands it passes upwardly through the collector chamber and into the cooler storage chamber. Cooler water from the storage chamber, in turn, passes to the bottom of the warmer collector chamber.

If such a panel is used during the day to collect solar energy and store heat for nighttime use, reverse thermosiphoning should be avoided to prevent energy loss. The above references disclose several types of control devices for preventing same. In particular, the U.S. Pat. No. 4,137,964 patent taught the use of a ball float valve which is temperature-dependent.

The present invention, however, provides an inexpensive temperature-dependent, double acting valve which will function at low pressure differences, exhibit low pressure drops, and prevent reverse thermosiphoning under normal conditions.

SUMMARY OF THE INVENTION

The present invention relates to a valve which comprises a housing having a lower fluid port and an upper fluid port, a primary valve seat interposed in the housing between said ports, and a valve element, movably disposed in the housing below the primary valve seat. The valve element is designed to have a slight buoyancy in the fluid at or below a specified normal operating temperature. This characteristic allows the element to sealingly engage the valve seat to prevent the upward flow of fluid under normal operating conditions; however, the member is readily dislodged from the seated position by the inertial fluid forces to permit the downward flow of fluid through the valve.

Materials for construction are selected for the movable valve element such that the element is more dense than the thermosiphon fluid at temperatures above the normal operating temperature. At these higher temperatures the valve member sinks and engages a lower auxiliary valve seat to prevent further heating of the water in the storage chamber.

BRIEF DESCRIPTION OF THE DRAWINGS

FIG. 1 is a schematic of a thermosiphon solar system equipped with a valve made in accordance with the present invention.

FIG. 2 illustrates a preferred embodiment of a valve made in accordance with the present invention.

FIG. 3 is a cross-section of the guide member taken along Section 3—3 of FIG. 2.

DETAILED DESCRIPTION OF THE PREFERRED EMBODIMENTS

Referring to the drawings, and to FIG. 1 in particular, there is shown a thermosiphon solar energy system. This system is basically comprised of a passive thermosiphon loop through which heat is transferred via a circulating liquid, such as oil, from an absorber exposed to the sun's radiation to a heat exchanger in thermal contact with a second fluid. Under normal operating conditions, flow is maintained in a clockwise circulation pattern with respect to the thermosiphon loop shown in FIG. 1. The heat transport liquid thus flows from the top of absorber 10 through line 12 to valve 14, from valve 14 through line 16 to heat exchange tubing 18, and from tubing 18 back to the absorber via line 20. A second fluid is heated by the transport liquid in housing 22.

The absorber 10 may be manufactured from a number of materials, although steel is a preferred construction material for use with an oil transport liquid. The preferred heat transport liquids should not freeze or boil within the expected operating temperature ranges of 70° F. (21.2° C.) to 180° F. (82.2° C.), or within potential temperature extremes of −40° F. (−40° C.) to 400° F. (204° C.).

Referring now to FIG. 2 of the drawings, there is shown a cross-section of a valve constructed in accordance with the teachings of this invention. As shown therein, there is provided a housing 50 having lower and upper ports 52 and 54, respectively, for the passage of liquid therethrough. There is also provided a primary valve seat 56 and an auxiliary valve seat 66 having central apertures through which all liquid passing through the valve must flow. Although the valve seats are shown as separate elements in the figure, it is within the spirit and scope of this invention to manufacture the seats directly from the housing walls as a unitary body. A spherical valve element 60 is movably disposed within the housing between the seats.

While the shapes of the primary valve seat and the mating valve member are preferably spherical, other shapes such as circular seats with conical valve members, square seats with inverted pyramidal valve members, frustroconical seats with spherical valve members, and the like may also be used. Valve element 60 will preferably have a density less than but quite close to the density of the liquid flowing through the valve at its normal operating temperature to minimize the pressure drop and increase the valve sensitivity. Thus, if the system is installed for preheating water to a hot water heater, the thermosiphoning fluid will normally be heated to a temperature in the range of 70° F. (21.2° C.) to 180° F. (82.2° C.) before passing through the valve. At these temperatures the density of a typical commercial heat transfer fluid, such as "Brayco 888", ranges rom 50.2 lbs per cubic foot (0.805 grams per centimeter³) to 47.5 lbs per cubic foot (0.762 grams per centimeter³) and the density of the valve member will preferably be no less than 95% and preferably no less than 99% of the fluid density.

Under normal operating conditions, the heated liquid from absorber 10 will pass upwardly through line 12 (see FIG. 1) into the upper port 54 (see FIG. 2) of the valve. the downward flow forces will displace buoyant valve element 60 from seat 56, thereby permitting the liquid to flow downwardly through the valve and out through port 52. However, if the liquid is warmer in tubing 18 than in absorber 10, the liquid will tend to flow from the tubing through line 16 to the absorber. The buoyant force in combination with the upward viscous fluid forces, under these conditions, however, will cause member 60 to lodge in valve seat 56 thereby preventing reverse thermosiphon flow.

Guide means are preferably used to insure proper seating of the movable ball element. As indicated in the figure, a guide cylinder 62 is placed below valve seat 56 in abutting relationship. The cylinder has a central circular aperture therein which is preferably slightly larger than the diameter of valve member 60. A plurality of longitudinal grooves or channels 64 are cut into the inner walls of the cylinder to provide a passageway for fluid flow around the movable element whenever the element is dislodged from the upper spherical seat. (See FIG. 3) Preferably guide cylinder 62 will have a length less than one valve member diameter.

Circular valve seat 66 is provided at the lower end of guide cylinder 62 for receiving valve member 60. A temperature dependent bimetallic strip 68 having a projecting tang 70 is provided to prevent the spherical ball element from seating in the auxiliary valve seat 66 under normal temperature conditions. At higher temperatures, however, the strip bends downward as indicated in the dashed outline of FIG. 2 to permit seating of the valve member.

Although no special materials of construction are required for the valve housing and seats, apart from those dictated by standard engineering considerations, the valve spherical element should exhibit certain characteristics in addition to the density requirements set forth above. At temperatures above the desired operating temperature, the valve member is designed such that it will become more dense than the circulated fluid. In general, the construction materials will be selected which have a density less than the heat transport fluid at the operating temperature and which thermally expand at rates slower than the fluid to become more dense than the fluid at the higher temperatures. One such valve construction material for use with commercial heat transfer oils which meets this criteria is low thermal expansion epoxy resin having small glass hollow filler spheres.

At high temperatures, such as temperatures above 180° F. (82.2° C.), it becomes desirable to prevent further heating of the water in the storage chamber. This is achieved by the present invention since the ball member will attain a density greater than the thermosiphoning fluid and become lodged in the auxiliary seat 66, thereby preventing further circulation of the hot heat transport fluid from the absorber to the storage unit.

Caps 72 and 74 conventionally seal the ends of housing 50 and provide a means for access to the interior thereof.

With a guide means, such as cylinder 62, the valve may be inclined as much as 70° from the vertical axis and the valve member will still seat properly under flow rates typically encountered in thermosiphon systems.

Hot transport liquid effluent from valve 14 passes through piping 16 into a double wall exchanger, generally referred to by reference numeral 18, which is encased within housing 22. Exchanger 18 is preferably comprised of two heat conducting concentric pipes 24 and 26. Inner pipe 24 is provided with spiral or longitudinal grooves 28 on the exterior surface thereof to permit oil to escape from the exchanger assembly in the event of a leak in pipe 24 or to prevent water to escape in the event of a leak in pipe 26. Housing 22 will also have inlet and outlet pipes 30 and 32, respectively, for the introduction and removal of the second fluid therefrom. In a preferred installation for the preheating of water to a hot water heater, the inlet second fluid will comprise cold tap water at line pressure and the thermosiphoning oil will normally be maintained at a positive static pressure of less than 75 psig (5.1 atmospheres). Preferably, housing 22 is sized sufficiently large to provide intermediate heat storage capacity for the system approximately equal to the hot water heater capacity. This permits the double wall exchanger 18 to be of minimum area since heat exchange from the collector to the second fluid will be spread over a long period of time.

An expansion chamber 34 is provided in open communication with the thermosiphon conduit in order to prevent rupture of the conduit or damage to the absorber as the result of the heat transport fluid expanding with increasing temperature. The chamber, having a volume in excess of the maximum anticipated fluid expansion volume, is preferably partially filled with a gas, such as nitrogen, which is compressed as the fluid expands. Other expansion means such as liquid-liquid diplegs and flexible diaphragms may also be used. The expansion chamber will preferably maintain the static pressure at the top of the thermosiphon loop below 50 psig (8.4 atmospheres).

I claim:
1. A valve for regulating the flow of fluid which comprises:
    a single housing having a lower fluid port and an upper fluid port;
    a primary valve seat interposed in said housing between said ports;
    a secondary valve seat interposed in said housing between said ports below said primary valve seat;
    a valve member movably disposed in said housing between said primary and said secondary valve seats which has a density less than the fluid at or below the specified normal operating temperature and a density greater than the fluid above the specified normal operating temperature, which valve member will sealingly engage the primary valve seat to prevent the upward flow of fluid if the operating temperature is at or below the specified normal operating temperature, and which valve member will disengage from the primary valve seat and occupy intermediate positions between said valve seats to permit the downward flow of fluid and said valve member will engage the secondary valve seat to prevent said downward flow of fluid if the operating temperature is above the specified normal operating temperature.
2. A valve as recited in claim 1 wherein said fluid is a liquid.

3. A valve as recited in claim 2 wherein said valve member is spherically shaped.

4. A valve as recited in claim 2 wherein said specified normal operating temperature is in the range 70°–180° F.

5. A valve as recited in claim 2 which further comprises:
   guide means for receiving the unseated valve member between said primary and secondary valve seats.

6. A valve as recited in claim 2 which further comprises:
   means to block said valve member from seating in the secondary valve seat as a result of downward flow forces whenever said liquid temperature is at or below the specified normal operating temperature.

7. A valve as recited in claim 6 wherein said means to block said valve member includes a temperature dependent bi-metallic strip having a projecting tang which interferes with the downward movement of said ball towards said secondary seat whenever the fluid temperature is at or below the specified normal operating temperature.

* * * * *